US009910477B2

(12) United States Patent
Kelly et al.

(10) Patent No.: US 9,910,477 B2
(45) Date of Patent: Mar. 6, 2018

(54) FPGA POWER MANAGEMENT SYSTEM

(71) Applicant: ZENTRUM MIKROELEKTRONIK DRESDEN AG, Dresden (DE)

(72) Inventors: Anthony Kelly, Old Kildimo (IE); Tycho Raab, Datteln (DE)

(73) Assignee: IDT EUROPE GmbH, Dresden (DE)

( * ) Notice: Subject to any disclaimer, the term of this patent is extended or adjusted under 35 U.S.C. 154(b) by 0 days.

(21) Appl. No.: 14/913,528

(22) PCT Filed: Aug. 27, 2014

(86) PCT No.: PCT/EP2014/068147
§ 371 (c)(1),
(2) Date: Feb. 22, 2016

(87) PCT Pub. No.: WO2015/032666
PCT Pub. Date: Mar. 12, 2015

(65) Prior Publication Data
US 2016/0209905 A1 Jul. 21, 2016

Related U.S. Application Data

(60) Provisional application No. 61/873,643, filed on Sep. 4, 2013.

(51) Int. Cl.
*G06F 1/32* (2006.01)
(52) U.S. Cl.
CPC .......... *G06F 1/3206* (2013.01); *G06F 1/3296* (2013.01); *G06F 1/3203* (2013.01); *Y02B 60/1285* (2013.01)
(58) Field of Classification Search
CPC ............................ G06F 1/3206; G06F 1/3296
(Continued)

(56) References Cited

U.S. PATENT DOCUMENTS 5,671,149 A 9/1997 Brown
6,326,806 B1 * 12/2001 Fallside .............. G06F 15/7867
326/38

(Continued)

FOREIGN PATENT DOCUMENTS

EP 0 992 876 A2 4/2000
EP 0992876 A2 4/2000

(Continued)

OTHER PUBLICATIONS

International Search Report for PCT/EP2014/068147 dated Nov. 25, 2014.

(Continued)

*Primary Examiner* — Jaweed A Abbaszadeh
*Assistant Examiner* — Volvick Derose
(74) *Attorney, Agent, or Firm* — Heslin Rothenberg Farley & Mesiti P.C.

(57) ABSTRACT

An FPGA power management system includes a host power management integrated circuit connected to a system power control block of an FPGA via an FPGA configuration/monitoring bus and a computing device via a power configuration/monitoring bus. The host power management integrated circuit includes a configuration and monitoring block configured to communicate configuration/monitoring signals to and from the FPGA system power control block and the computing device. The host power management integrated circuit further includes at least one voltage regulator for supplying an output voltage to an FPGA power rail according to a power configuration signal communicated by the configuration and monitoring block. The host power management integrated circuit further includes a power profiler configured to measure and supply to the configuration and monitoring block an output current on the FPGA power rail. The FPGA system power control block is con- (Continued)

figured to coordinate and execute a transfer of required communications between the FPGA and the host power management integrated circuit.

14 Claims, 2 Drawing Sheets

(58) Field of Classification Search
USPC .......................................................... 713/320
See application file for complete search history.

(56) References Cited

U.S. PATENT DOCUMENTS

| | | | |
|---|---|---|---|
| 7,117,378 B1 | 10/2006 | Maksimovic et al. | |
| 7,992,020 B1 | 8/2011 | Tuan et al. | |
| 8,010,931 B1* | 8/2011 | French | G06F 17/5054 703/14 |
| 8,072,247 B1* | 12/2011 | Wright | G06F 1/24 327/143 |
| 8,601,288 B2* | 12/2013 | Brinks | G06F 1/26 365/202 |
| 8,639,952 B1* | 1/2014 | Chan | G06F 1/26 713/300 |
| 9,425,794 B1* | 8/2016 | Omernick | H03K 19/00369 |
| 9,525,423 B1* | 12/2016 | Lesea | G01R 31/31851 |
| 2005/0088201 A1* | 4/2005 | Devlin | G06F 1/26 326/38 |
| 2007/0028129 A1* | 2/2007 | Schumacher | G06F 1/3203 713/320 |
| 2008/0238655 A1* | 10/2008 | McShane | G06F 1/32 340/538 |
| 2008/0313312 A1* | 12/2008 | Flynn | G06F 1/183 709/221 |
| 2010/0102790 A1* | 4/2010 | Buterbaugh | H02M 3/1584 323/283 |
| 2010/0162019 A1* | 6/2010 | Kumar | G06F 1/3203 713/323 |
| 2010/0250974 A1* | 9/2010 | Ristic | G06F 1/3203 713/300 |
| 2010/0268523 A1* | 10/2010 | Dhanwada | G06F 11/3013 703/21 |
| 2011/0154085 A1 | 6/2011 | Rickard | |
| 2011/0320848 A1* | 12/2011 | Perry | G06F 17/505 713/340 |
| 2013/0027080 A1* | 1/2013 | Sugiyama | H03K 19/17756 326/41 |
| 2013/0283083 A1* | 10/2013 | Vilhauer | G06F 13/24 713/340 |
| 2014/0075224 A1* | 3/2014 | Lee | G06F 1/324 713/322 |
| 2014/0223205 A1* | 8/2014 | Muthukaruppan | G06F 1/32 713/320 |
| 2014/0223217 A1* | 8/2014 | Nabhane | G05F 1/625 713/340 |
| 2014/0232188 A1* | 8/2014 | Cheriyan | G06F 1/3296 307/31 |
| 2015/0039916 A1* | 2/2015 | Case | G06F 1/263 713/310 |

FOREIGN PATENT DOCUMENTS

| | | |
|---|---|---|
| EP | 1233328 A2 | 8/2002 |
| TW | I220738 B | 9/2004 |
| TW | I232308 B | 5/2005 |

OTHER PUBLICATIONS

Aldham, et al; "Low-Cost Hardware Profiing of Run-Time and Energy in FPGA Embedded Processors," IEEE International Conference on Application-specific Systems, Architectures and Processors (ASAP), Santa Monica, CA, Sep. 2011.

Altera, "Voltage Regulator Selection for FPGAs," White Paper, Nov. 2008, ver. 1.0.

* cited by examiner

FPGA POWER MANAGEMENT SYSTEM

CROSS REFERENCE TO RELATED APPLICATIONS

This application is a national stage filing under section 371 of International Application No. PCT/EP2014/068147, filed on Aug. 27, 2014, and published in English on Mar. 12, 2015, as WO 2015/032666A1, which claims priority of U.S. Provisional Application No. 61/873,643 filed on Sep. 4, 2013, the entire content of said applications being hereby incorporated herein by reference.

FIELD OF THE INVENTION

The present invention relates to an FPGA (field programmable gate array) power management system. The present invention specifically relates to an FPGA power system management suitable for co-designing the FPGA and the power management of the FPGA.

BACKGROUND OF THE INVENTION

In many electronic devices FPGAs are widely used for a variety of tasks taking advantage of aspects such as their processing power, re-configurability and flexibility in the design process. Furthermore, design tradeoffs in the FPGA circuit configuration affect power consumption, data throughput and processing rate. While the amount of gates and feature operations are constantly increasing, FPGAs consume significant and increasing amount of power. Hence, when designing circuits using FPGAs it is important to properly design the system to supply sufficient power and cooling to ensure correct operation. However, today's oversized power and cooling leads to increased power loss and lower efficiency of the overall system.

Prior art systems have addressed the issue of automatically adjusting the Vdd of a signal processing circuit by discriminating the slack time compared to a reference clock, e.g. U.S. Pat. No. 7,117,378, Adaptive voltage scaling digital processing component and method of operating the same. However the FPGA system designer is unable to apply this to understand how to optimise the system for power consumption or performance. For example, such a method would optimize the Vdd for a target clock frequency but the FPGA system designer would benefit from knowing the power consumption profile over time and could use that information to inform the design process of the system incorporating the FPGA. The aforementioned prior art does not address this important issue.

The prior-art method of determining power consumption information used to inform the design process of the system incorporating the FPGA is to estimate the power consumption using software based design estimation algorithms, which are limited in accuracy.

Prior-art profilers are limited in that they profile cycle-counts for execution of code segments on FPGA based soft processors. A typical example is disclosed in: M. Aldham, J. H. Anderson, S. Brown, A. Canis, "Low-Cost Hardware Profiling of Run-Time and Energy in FPGA Embedded Processors," IEEE International Conference on Application-specific Systems, Architectures and Processors (ASAP), Santa Monica, Calif., September 2011. Accurate power profiles corresponding to the respective code segments are not available using such techniques. The addition of power measurement circuits may increase power losses, which is undesirable.

Managing the power in a system utilizing FPGAs involves limited, centralized power management to a diverse set of Point of Load regulators (POLs) and Low Drop Out regulators (LDOs) with little or no interaction, communication or processing involved in the power management aspect of the system, for example: Altera, Voltage Regulator Selection for FPGAs, White Paper, November 2008, ver. 1.0. Therefore the ability to optimize such systems using a co-design methodology is limited.

Therefore what is required is a solution whereby the designer applying FPGAs in their circuits and systems can accurately assess the FPGA power consumption in real time and be provided with the information and data required to take steps to optimize the power consumption of the system through a method of hardware-firmware-power co-design.

This solution is achieved with an FPGA power management system according to the independent system claim. Dependent claims relate to further aspects of the invention.

The present invention relates to an FPGA power management system comprising a host power management integrated circuit connected to a system power control block of an FPGA via an FPGA configuration/monitoring bus and a computing device via a power configuration/monitoring bus.

The host power management integrated circuit comprises a configuration and monitoring block configured to communicate configuration/monitoring signals to and from the FPGA system power control block and the computing device. The host power management integrated circuit further comprises at least one voltage regulator for supplying an output voltage to an FPGA power rail according to a power configuration signal communicated by the configuration and monitoring block. The host power management integrated circuit further comprises a power profiler configured to measure and supply to the configuration and monitoring block an output current on the FPGA power rail.

The FPGA system power control block is configured to coordinate and execute a transfer of required communications between the FPGA and the host power management integrated circuit.

The computing device comprises a display and an input device for monitoring and controlling aspects of an FPGA operation.

The monitoring aspects may comprise dynamic and average current consumption on the FPGA power rail.

For that purpose, the power profiler may be configured to supply cycle-by-cycle dynamic current measurements and average currents to the configuration and monitoring block.

Thus, the FPGA system designer is able to configure the FPGA circuits and power supplies over the FPGA configuration/monitoring bus and the power configuration monitoring bus and monitors the system operation by use of the computing device with connected monitor and input devices.

As a method of co-design, the FPGA system designer is thus able to monitor aspects of the FPGAs operation such as dynamic and average current consumption of the power rail.

The co-design aspect relates to the FPGA system designer acting on the information received in order to alter the FPGA configuration or power. For example, the FPGA system designer may compare the power profiles of two embodiments of a function in the FPGA; one embodiment implemented in firmware on a soft processing core on the FPGA; the other embodiment implemented as clocked registers and logic on the FPGA, and may choose one or the other embodiment for final implementation based upon the preferred power consumption or power profile. In this way the thermal and power needs of the FPGA may be optimized.

Furthermore, the FPGA system designer may use the information to decide to clock parts of the FPGA circuits from different clock frequencies to optimise power and execution speed. Furthermore, the FPGA system designer may configure the power supplies for lower or higher voltage levels in order to optimise power and execution speed. In this way a co-design method allows the FPGA system designer to optimise the power and configuration of the FPGA design to meet design objectives based upon feedback supplied to the FPGA system designer.

The FPGA power management system may be integrated in a co-design environment comprising FPGA design tools and power design tools. The FPGA design tools and the power design tools may run simultaneously or within the same environment or application on the computing device with connected monitor and input devices The FPGA power managements system can automatically adjust within limits to e.g. firmware upgrades, which may be implemented during live time of the end-product on the fly.

One aspect of the present invention relates to an optimal power generation. The system power control block of the FPGA may further optimize energy efficiency by providing power demand information to the host power management integrated circuit, which can adjust power levels to the actual needs. While knowing the actual power need upfront, the host power management integrated circuit can prepare power needs ahead of time. This may result in additional energy savings. Vice versa the FPGA device can perform system power management and system power optimization. The system power control block of the FPGA may be a soft block or a hard block.

One aspect of the present invention relates to the computing device. Code running on the computing device with connected monitor and input devices may guide the FPGA system designer by displaying prompts and suggested values for configuration of the FPGA and power controllers in order to optimize a system parameter such as power losses or thermal dissipation.

In yet another embodiment said code may adjust the configuration of the FPGA and power controllers automatically.

BRIEF DESCRIPTION OF THE DRAWINGS

The FPGA power management system according to the invention is described in more detail herein below by way of exemplary embodiments and with reference to the attached drawings, in which.

DETAILED DESCRIPTION

Figure 3:
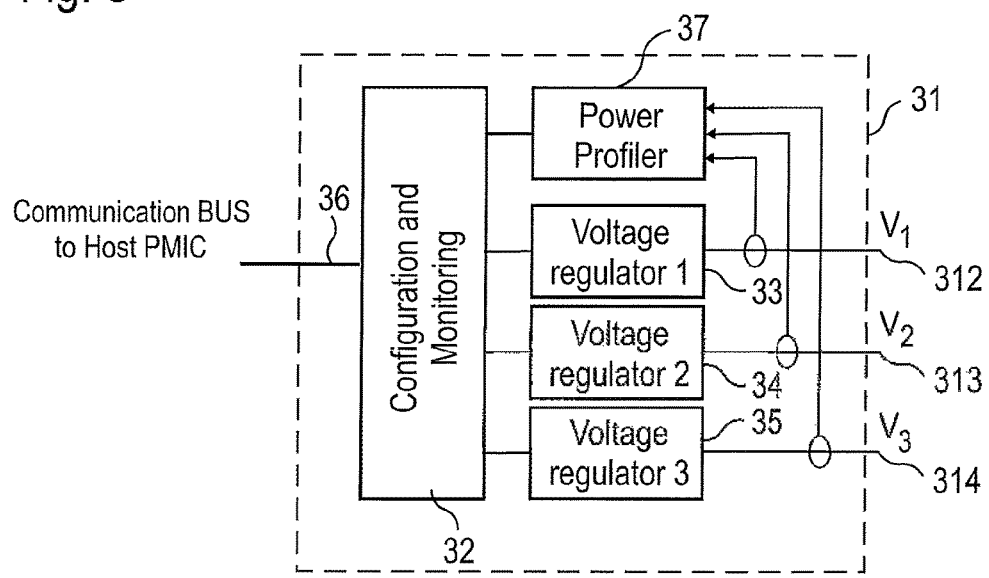
FIG. 3 shows a block diagram of a slave power management integrated circuit.

FIG. 3 shows an Embodiment of an FPGA Power management System according to aspects of the invention. In the preferred embodiment the FPGA system designer configures the FPGA circuits 12 and power supplies 19, 110, 111, 112, 113, 114 over various busses 14, 15, 16, 17 and monitors the system operation by use of the computing device 13 with connected monitor and input devices.

The FPGA power management system comprises a host power management integrated circuit (HPMIC) 11 connected to a system power control block of an FPGA 12 via an FPGA configuration/monitoring bus 14 and a computing device via a power configuration/monitoring bus 15. The computing device is further connected to the FPGA system power control block 12 via another configuration/monitoring bus 17. The FPGA system control block 12 is configured to coordinate and execute a transfer of required communications between the FPGA and the host power management integrated circuit 11.

Figure 1:
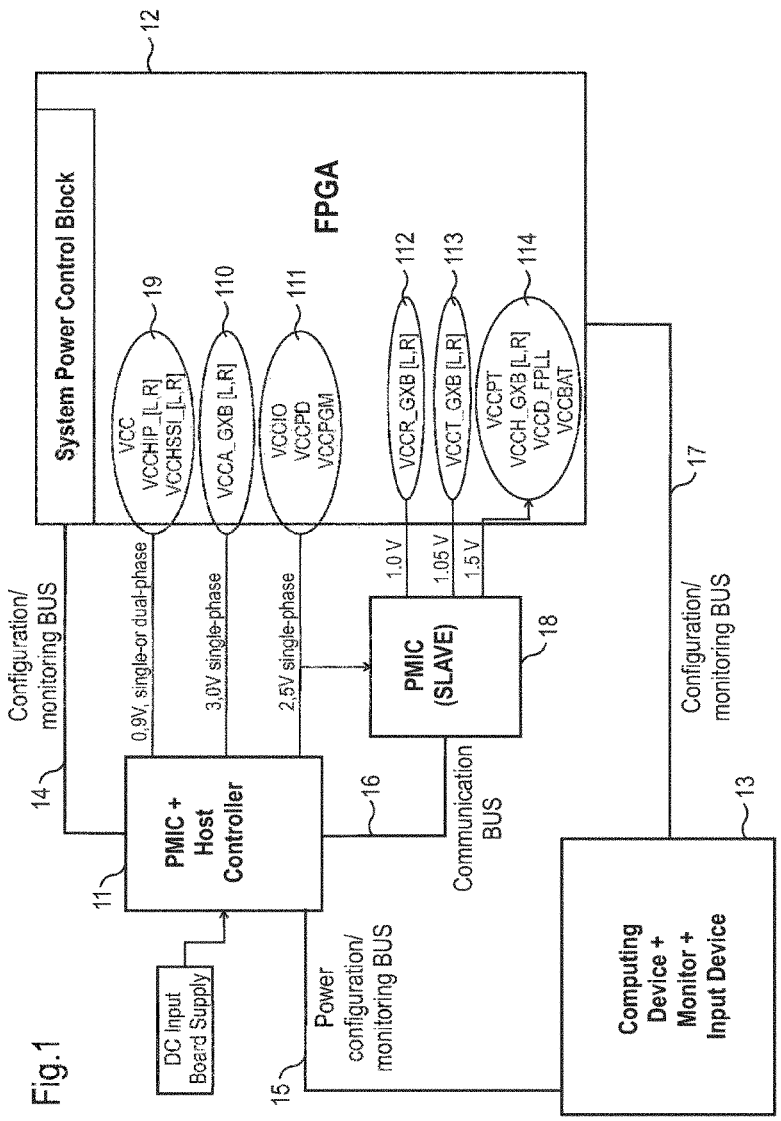
FIG. 1 shows a block diagram of an FPGA power management system.
Figure 2:
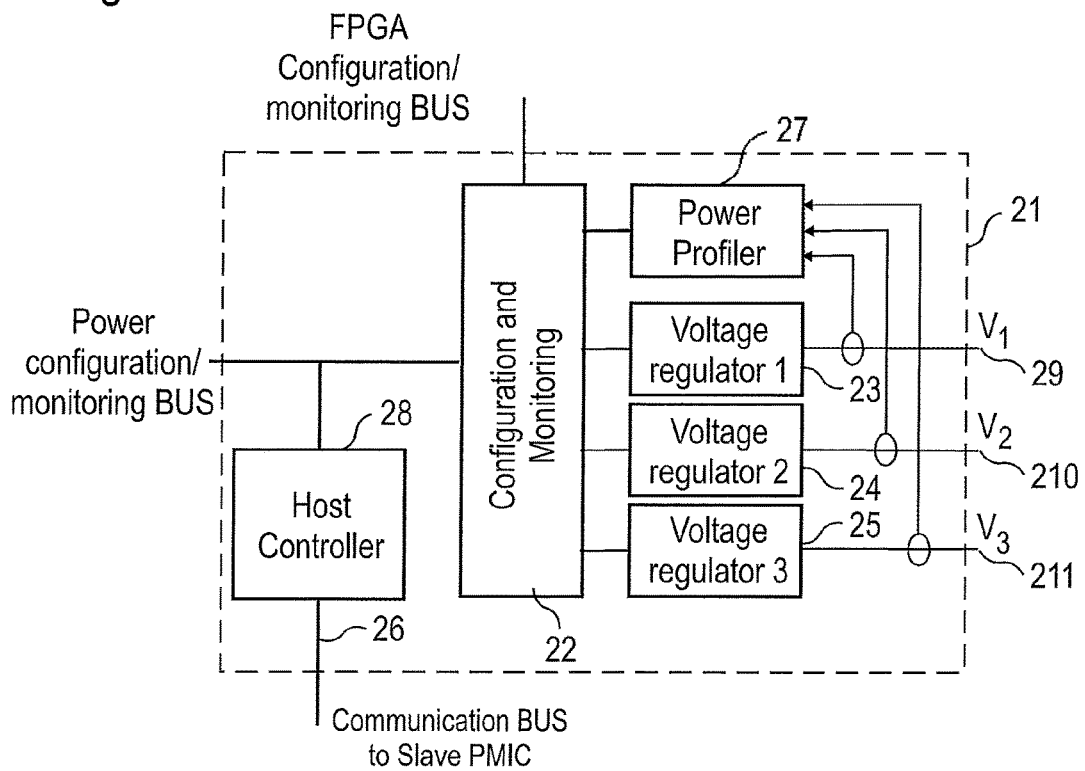
FIG. 2 shows a block diagram of a host power management integrated circuit.

A preferred embodiment of the HPMIC 21 is shown in FIG. 2. The input voltage is omitted for clarity. The power profiler block 27 measures the current on the voltage outputs V1 to V3 generated by voltage regulators 23, 24, 25 on FPGA power rails 29, 210, 211 (119, 110, 111 in FIG. 1) supplying cycle-by-cycle dynamic current measurements and average currents to the configuration and monitoring block 22 and host controller 28. The Power configuration/monitoring BUS 15 can communicate the current measurements and/or other relevant data to the FPGA system designer for the purposes of monitoring and co-design.

In a system, it may be preferred to concentrate the processing of the host controller 28 and associated control, clocking and timing units in the host PMIC. Now returning to FIG. 1, accordingly a Communication BUS 16 (26 in FIG. 2) to the Slave PMIC 18 is provided in order to configure and control the slave PMIC 18. The Slave PMIC 31 is shown in FIG. 3. Again, the input voltage is omitted for clarity. The power profiler block 37 measures the current on the voltage outputs V1 to V3 generated by voltage regulators 33, 34, 35 on FPGA power rails 312, 313, 314 (112, 113, 114 in FIG. 1), supplying cycle-by-cycle dynamic current measurements and average currents to the configuration and monitoring block 32. The Communication BUS 36 (26 in FIG. 2) can communicate the current measurements and/or other relevant data to the host controller 28 of the host PMIC 21 as shown in FIG. 2.

The slave PMIC may be designed on a process most suitable for the purpose of voltage regulation, for example a Bipolar process. The Host PMIC may be designed on a mixed-signal process taking advantage of optimised digital devices for the digital circuits of the host controller and clocking circuits Now returning to FIG. 1, as a method of co-design, the FPGA system designer monitors aspects of the FPGAs operation such as dynamic and average current consumption of the power rails 119, 110, 111, 112, 113, 114 which is communicated to the FPGA system designer from the PMIC Host controller (28 in FIG. 2) of the Host PMIC 11. The System Power Control Block 12 in the FPGA may be a soft or hard block that coordinates and executes the transfer of required communications between the FPGA and Host PMIC 11 for the purposes of controlling the profiling operations in time and function.

The co-design aspect relates to the user acting on the information received in order to alter the FPGA configuration or power. In one embodiment such a co-design environment would consist of running FPGA design tools and Power design tools simultaneously or within the same environment or application on the computing device with connected monitor and input devices.

The invention claimed is:
1. An FPGA power management system comprising:
a host power management integrated circuit connected to a system power control block of an FPGA via an FPGA configuration/monitoring bus and a computing device via a power configuration/monitoring bus;
the host power management integrated circuit comprising:

a configuration and monitoring block configured to communicate configuration/monitoring signals to and from the FPGA system power control block and the computing device;

at least one voltage regulator for supplying an output voltage to an FPGA power rail according to a power configuration signal communicated by the configuration and monitoring block;

a power profiler configured to measure and supply to the configuration and monitoring block an output current on the FPGA power rail;

the FPGA system power control block configured to coordinate and execute a transfer of required communications between the FPGA and the host power management integrated circuit; and the computing device comprising a display and an input device for monitoring and controlling of an aspect of FPGA operation, and FPGA design tools and power design tools for altering FPGA configuration or power;

wherein the monitoring of an aspect of the FPGA operation comprises monitoring of dynamic and average current consumption on the FPGA power rail; and wherein the controlling of an aspect of the FPGA operation comprises altering of the FPGA configuration or power with said FPGA design tools and power design tools, based upon said monitoring, in a co-design aspect, to optimize at least one of the following FPGA operation parameters: thermal needs, thermal dissipation, power needs, power losses, power generation, execution speed, power, configuration and energy efficiency.

2. The FPGA power management system according to claim 1, wherein the power profiler is further configured to supply cycle-by-cycle dynamic current measurements and average currents to the configuration and monitoring block.

3. The FPGA power management according to claim 1, wherein the power configuration/monitoring bus is configured to communicate relevant data for purposes of monitoring and co-design.

4. The FPGA power management according to claim 3, wherein the relevant data comprises current measurements.

5. The FPGA power management according to claim 1, wherein the host power management integrated circuit further comprises a host controller connected to the power configuration/monitoring bus and configured to control a slave power management integrated circuit via a slave communication bus.

6. The FPGA power management system according to claim 5, wherein the slave power management integrated circuit comprises a slave configuration and monitoring block;

at least one voltage regulator for supplying an output voltage to another FPGA power rail according to a power configuration signal communicated by the configuration and monitoring block; and a slave power profiler configured to measure and supply to the configuration and monitoring block an output current on the other FPGA power rail.

7. The FPGA power management system according to claim 6, wherein the host power management integrated circuit is based on a mixed-signal process and the slave power management integrated circuit is based on an analog process.

8. The FPGA power management system according to claim 7, wherein the analog process is a Bipolar process.

9. The FPGA power management system according to claim 1, wherein the system power control block of the FPGA is a soft block or a hard block.

10. The FPGA power management system according to claim 1 adjustable to firmware upgrades.

11. The FPGA power management system according to claim 1, wherein the system power control block of the FPGA is configured to provide a power demand forecast to the host power management integrated circuit and wherein the host power management integrated circuit is configured to adjust power levels to actual needs ahead of time.

12. The FPGA power management system according to claim 1, wherein the computing device is configured to execute code that may guide a user by displaying prompts and suggested values for configuration of the FPGA and voltage regulator in order to optimize a system parameter.

13. The FPGA power management system according to claim 12, wherein the system parameter comprises power losses or thermal dissipation.

14. The FPGA power management system according to claim 1, wherein the computing device is configured to execute code that adjusts the configuration of the FPGA and power controllers automatically.

* * * * *